*R. Johnson,*
*Subsoil Plow.*
*No. 102,825.* *Patented May 10, 1870.*
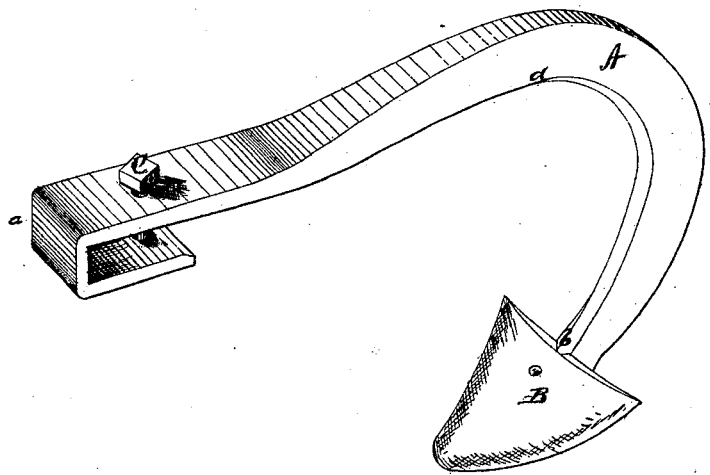
Witnesses
Inventor
Ross Johnson
per
Alexander T. Mason
Atty.

UNITED STATES PATENT OFFICE.

ROSS JOHNSON, OF LAWRENCE, KANSAS.

IMPROVEMENT IN SUBSOIL ATTACHMENTS FOR PLOWS.

Specification forming part of Letters Patent No. 102,825, dated May 10, 1870.

*To all whom it may concern:*

Be it known that I, ROSS JOHNSON, of Lawrence, in the county of Douglas, and in the State of Kansas, have invented certain new and useful Improvements in Subsoil Attachments for Plows; and I do hereby declare that the following is a full, clear, and exact description thereof, reference being had to the accompanying drawing, and to letters of reference marked thereon, making a part of this specification.

The nature of my invention consists in the construction and mode of attaching the subsoil attachment for plows, as will be hereinafter fully set forth.

In order to enable others skilled in the art to which my invention appertains to make and use the same, I will now proceed to describe its construction and operation, referring to the annexed drawing, which represents a perspective view of my subsoil attachment.

A represents the subsoil bar or shank, made heavy and somewhat in the form of a gooseneck, having a square hook, *a*, formed at its front end. From this hook *a* it is curved slightly upward, then downward and forward, as shown, and has at its lower end the barb or blade B, secured to it by means of a bolt or screw. The blade or barb B may be of any suitable size and shape, and can readily be removed, so as to substitute another of different size or one of the same size when the old one is worn out or otherwise injured. From the upper edge or blade B a sharp or knife edge is formed on the inner edge of the shank A around the curve from *b* to *d* for the purpose of cutting roots, &c.

On most of the plows used in our western country there is a bar connecting and bracing the mold-board and landside, and it is for this style of plows my attachment is particularly designed, although it can readily be adapted to plows of any construction. It is attached to the plow by passing the hook *a* over said bar and drawing it back, allowing the bar to enter into the hook, when a set-screw, C, is passed through the hook immediately in rear of the bar, which firmly secures the subsoiler in place. By this means the strain of the draft would come on the shank itself; but the weight of the shank counteracts in a great measure this strain.

The object and operation of the subsoiler need no description, as they are well known.

In some cases I may dispense with the curvature of the shank A, and make it almost, if not perfectly, straight, with a knife-edge on the front side. In this case there would be a slot in the rear side, near the upper end of the shank, which is slipped over the front side of the bar in the plow and secured by a set-screw.

When it is necessary to subsoil wider than could be done with one blade I may construct the bar A in such a manner that it will fork a short distance in rear of the loop *a*, branching off into two or more arms, each of which is shaped in the same manner, as above described, and provided with a blade or barb at the lower ends.

Having thus fully described my invention, what I claim as new, and desire to secure by Letters Patent, is—

The herein-described subsoil attachment for plows, provided with the angular loop or hook *a* at its forward end and a set-screw, *c*, at the rear end of the loop, and with the curved knife-edge *d b*, extending down to the removable blade B, substantially as and for the purposes herein set forth.

In testimony that I claim the foregoing I have hereunto set my hand this 21st day of April, 1870.

ROSS JOHNSON.

Witnesses:
A. N. MARR,
C. L. EVERT.